UNITED STATES PATENT OFFICE.

JOHN O. WILLIAMS, OF TOLEDO, OHIO.

IMPROVEMENT IN ARTIFICIAL MARBLE.

Specification forming part of Letters Patent No. 201,580, dated March 19, 1878; application filed February 5, 1878.

*To all whom it may concern:*

Be it known that I, JOHN O. WILLIAMS, of Toledo, in the county of Lucas and State of Ohio, have invented a certain Improved Composition for Artificial Marble, of which the following is a specification:

My invention consists in a new composition of matter forming an artificial marble of great strength, cheapness, and closeness of grain, which is well adapted for use in the manufacture of coffins, mantels, and similar articles.

In preparing my composition I provide the following: Alum, one ounce; white sugar, one scruple; cream of tartar, one-half scruple; water, one gallon.

The three first-named ingredients are dissolved in the water, and then Keen's cement, or other similar hydraulic cement, added until the mass attains the desired consistency. Suitable coloring matter may then be distributed through the mass, and the latter rolled or kneaded until the desired appearance of veins is produced. The material is then worked or molded into any desired form and permitted to harden.

A slight variation may be made in the proportions of the ingredients; but no material variation should be made.

I am aware that artificial marble has been made of many different compounds, and that Keen's cement and alum have been used therein; but I am not aware that any one has hitherto used the sugar and cream of tartar in connection with the other elements named, and by their use I produce a stone which becomes very hard, and which is susceptible of a higher polish than those now in use.

Having thus described my invention, what I claim is—

An artificial marble consisting of alum, sugar, cream of tartar, water, and cement, in substantially the proportions specified.

JOHN O. WILLIAMS.

Witnesses:
JOHN J. BRADY,
H. A. KANE.